United States Patent [19]

Wada et al.

[11] Patent Number: 4,758,949

[45] Date of Patent: Jul. 19, 1988

[54] INFORMATION PROCESSING APPARATUS

[75] Inventors: Kenichi Wada, Sagamihara; Kazunori Kuriyama; Akira Yamaoka, both of Kokubunji, all of Japan

[73] Assignee: Hitachi, Ltd., Tokyo, Japan

[21] Appl. No.: 928,055

[22] Filed: Nov. 7, 1986

[30] Foreign Application Priority Data

Nov. 15, 1985 [JP] Japan .................. 60-254762

[51] Int. Cl.[4] ............................................. G06F 9/38
[52] U.S. Cl. ............................................. 364/200
[58] Field of Search ... 364/200 MS File, 900 MS File

[56] References Cited

U.S. PATENT DOCUMENTS

| | | | |
|---|---|---|---|
| 4,025,771 | 5/1977 | Lynch, Jr. et al. | 364/200 X |
| 4,187,539 | 2/1980 | Eaton | 364/200 |
| 4,228,497 | 10/1980 | Gupta et al. | 364/200 |
| 4,251,859 | 2/1981 | Momose et al. | 364/200 |
| 4,270,181 | 5/1981 | Tanakura et al. | 364/200 X |
| 4,295,193 | 10/1981 | Pomerene | 364/200 |
| 4,365,311 | 12/1982 | Fukunaga et al. | 364/900 |
| 4,398,245 | 8/1983 | Fujita | 364/200 |
| 4,399,507 | 8/1983 | Cosgrove et al. | 364/200 |
| 4,435,756 | 3/1984 | Potash | 364/200 |
| 4,471,432 | 9/1984 | Wilhite et al. | 364/200 |
| 4,471,433 | 9/1984 | Matsumoto et al. | 364/200 |
| 4,507,728 | 3/1985 | Sakamoto et al. | 364/200 |
| 4,532,589 | 6/1985 | Shitani et al. | 364/200 |
| 4,541,047 | 9/1985 | Wada et al. | 364/200 |
| 4,580,238 | 4/1986 | Sawada | 364/200 X |
| 4,594,655 | 6/1986 | Hao et al. | 364/200 |
| 4,594,659 | 6/1986 | Guenthner et al. | 364/200 |

Primary Examiner—Gareth D. Shaw
Assistant Examiner—Viet Q. Nguyen
Attorney, Agent, or Firm—Antonelli, Terry & Wands

[57] ABSTRACT

An information processing apparatus having a buffer register for pre-fetching a plurality of instructions and executing one instruction after another by reading them from the buffer registers, is provided with a first instruction decode start determination unit for register type instructions and a second instruction decode start determination unit for non-register type instructions, provided separately from the first unit, whereby 0.5 cycle after a register type instruction starts being decoded, or 1 cycle after a non-register type instruction starts being decoded, the next instruction starts to be decoded. By decoding a register type instruction at high speed, it becomes possible to execute a branch instruction at high speed.

5 Claims, 4 Drawing Sheets

INFORMATION PROCESSING APPARATUS

BACKGROUND OF THE INVENTION

The present invention relates to an information processing apparatus of the type in which instructions are executed by a pipeline control method, by which instructions are executed at high speed.

A format of a non-register type instruction, typically a branch instruction, is shown in FIG. 1A. In the figure, OP represents an operation code (OP code) of an instruction. Mask field M1 indicates a branch condition. An address of a target instruction to be branched is obtained from a sum of (X2)+(B2)+D2, wherein ( ) represents the contents of the register. A format of a register type (RR type) instruction is shown in FIG. 1B. In the figure, OP represents an operation code of an instruction. The first operand is held in a register designated by R1 in a general purpose register or a floating-point register, while the second operand is held in a register designated by R2 in the general purpose register or a floating-point register. A register type instruction is characterized by the fact that both operands are held in registers. In the present application, a register type instruction or a first type instruction is defined as an instruction of the type in which all of the operands necessary to execute such instruction are stored in certain registers in the general purpose register or the floating-point register and a non-register type instruction or a second type instruction is defined as an instruction of the type in which at least one of the operands necessary to execute such instruction is held in the memory.

FIG. 2A illustrates the conventional operation of a branch instruction using a pipeline control method. D, A, L, E and P in FIG. 2A each represent a stage in pipelining operation. A different instruction is inputted into a pipeline one cycle after another, and a plurality of instructions can be processed in parallel at a time. In FIG. 2A, instructions 0 to 3 represent a register type instruction, instruction 4 represents a branch instruction which is a non-register type instruction, and instruction 5 represents a target instruction to be branched.

Stage D decodes an instruction, reads an index register (X2) and a base register (B2) to perform a logical operation (X2)+(B2)+D2 on the basis of the read contents of the registers, and obtains an address of a storage unit from which data (operand) to be executed is read out. Stages A and L access the storage unit on the basis of the obtained address. Stage E executes the read operand data. Stage P writes the executed result in registers.

Conventionally, fetching a target instruction 5 to be branched has been executed at stages D, A and L of the branch instruction 4. The target instruction 5 to be branched is loaded into an instruction buffer at the E stage following the L stage of the branch instruction 4. As a result, as shown in FIG. 2A, if the stage E is considered, the stage E of the target instruction 5 to be branched starts 3 cycles after stage E of the branch instruction 4 so that the operation performance of the branch instruction is poor.

Further, since decoding of the instruction which follows a register type instruction like the instruction 0, 1, 2 or 3 is possible only after completion of the D stage of the register type instruction, there is a problem that it takes a long time to execute a plurality of instructions which includes register type instructions.

A related information processing apparatus of this type is disclosed, for example, in JP-A- No. 59-94444.

SUMMARY OF THE INVENTION

It is an object of the present invention to provide an information processing apparatus capable of executing a branch instruction at high speed.

It is another object of the present invention to provide a pipeline control type information processing apparatus which is capable of executing a plurality of instructions at an improved speed.

To achieve the above objects, in accordance with one aspect of the present invention, in an information processing apparatus having a buffer register for prefetching a plurality of instructions and executing one instruction after another by reading them from the buffer register, a first determination means for determining, in the case where an instruction which is just put under decoding is the register type instruction, whether or not decoding of the next instruction is ready to be started and a second determination means for determining, in the case where an instruction which is just put under decoding is the non-register type instruction, whether or not decoding of the next instruction is ready to be started are separately provided so that the output of the first determination means can be sent 0.5 cycle before the output of the second determination means, and that, in response to the first and second determination means, 0.5 cycle after a register type instruction starts being decoded, or 1 cycle after a non-register type instruction starts being decoded, the next instruction starts to be decoded.

Registers for holding an instruction to be decoded are constructed such that they can be switched at each 0.5 cycle, and an instruction queue for holding an instruction subjected to decoding is constructed such that it can be enabled at intervals of 0.5 cycle pitch. The logic for determining, in the case of a non-register type instruction started to be decoded, whether or not decoding of a next instruction is ready to be started depends on various conditions such as whether an operand address is correct or not, whether a memory request can be effected, and the like. Thus, the logic requires a number of logical steps or stages, resulting in a prolonged time for the determination means to produce the determination results indicating start of decoding of the next instruction being ready. In contrast, the determination logic to be used in the case of a register type instruction started to be decoded, is extremely simple as understood from its format so that the number of logical steps or stages and its scale are small, and it takes only a short time for the determination means to produce the determination results. Taking this into account, it becomes possible to decode instructions which follow register type instructions at high speed by separately providing the first determination means for determining, in the case where the instruction which is just put under decoding is the register type instruction, whether or not decoding of the next instruction following the instruction under decoding is ready to be started and the second determination means for determining, in the case where the instruction which is just put under decoding is the non-register type instruction, whether or not decoding of the next instruction is ready to be started and by starting the decoding of the next instruction, when the instruction under decoding is the register type instruction, in response to the first determination means.

DESCRIPTION OF THE PREFERRED EMBODIMENTS

Figure 1A:
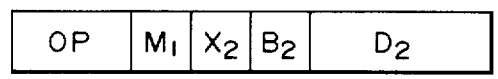
FIG. 1A is a view showing a format of a branch instruction.
Figure 1B:
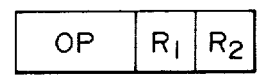
FIG. 1B is a view showing a format of a register type instruction.

A preferred embodiment of the present invention will be described with reference to the accompanying drawings. FIG. 2B is a view showing an operation of a branch instruction according to the present invention. In the figure, instructions 0, 1, 2 and 3 are register type instructions, instruction 4 is a branch instruction which is a non-register type instruction, and instruction 5 is a target instruction to be branched. Since instruction 0 is of register type, stage D of the next instruction 1 can start 0.5 cycle after the start of stage D of instruction 0. Instruction 1 is also of register type so that stage D of the next instruction 2 can start 0.5 cycle after the start of stage D of the next instruction 3. Similarly, D stages of instructions 2 and 3 start 0.5 cycle after the start of D stages of the next instructions 3 and 4, respectively. Instruction 1 is executed in the order of D, A, L, E and P similarly to the conventional case shown in FIG. 2A. Stage E of instruction 1 cannot be executed with stage E of instruction 0 overlapped with stage E of instruction 1 so that the start of E stage of instruction 1 waits for the end of executing stage E of instruction 0, thus causing a 0.5 cycle wait. Similarly, the start of instructions 2, 3 and 4 wait for the end of executing stages E of the preceding instructions 1, 2 and 3, thus causing a wait.

Figure 2A:
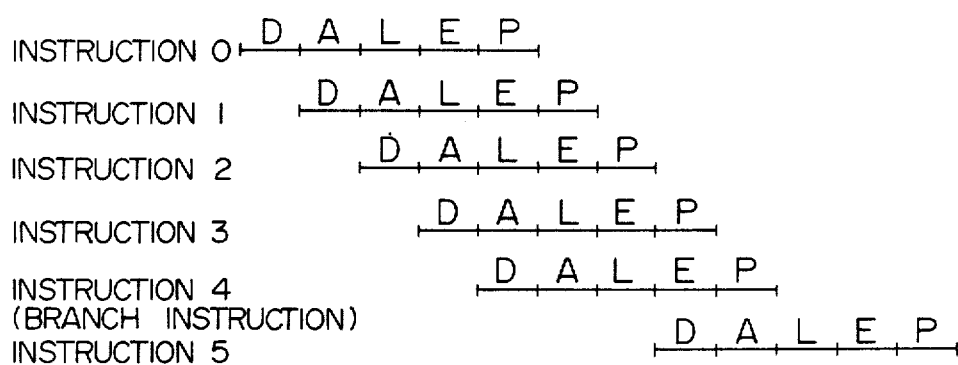
FIG. 2A is a view illustrating a conventional operation of a branch instruction.
Figure 2B:
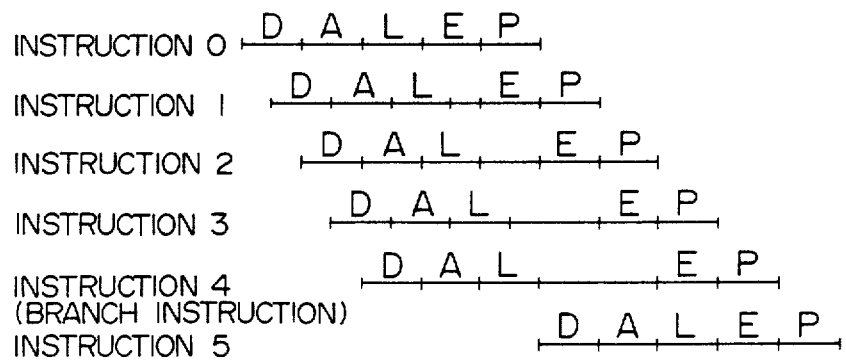
FIG. 2B is a view illustrating an operation of a branch instruction according to the present invention.

Since the D stages of instructions 1, 2 and 3 start at intervals of 0.5 cycle pitch, the D stage of branch instruction 4 can start 2 cycles earlier than the conventional one shown in FIG. 2A. Similarly to conventional one shown in FIG. 2A, in executing branch instruction 4, the target instruction to be branched is fetched at stages D, A and L of the branch instruction, and the target instruction is loaded in an instruction buffer at the stage following L stage. Therefore, as shown in FIG. 2B, the D stage of the target instruction 5 to be branched can be executed after the stage following L stage of branch instruction 4.

As described above, the D stage of a register type instruction can start 0.5 cycle after the start of the D stage of the preceding instruction. Therefore, if stage E is considered, a 3 cycle wait as in the conventional one is shortened to 1 cycle for executing the E stage of a branch instruction.

Figure 3:
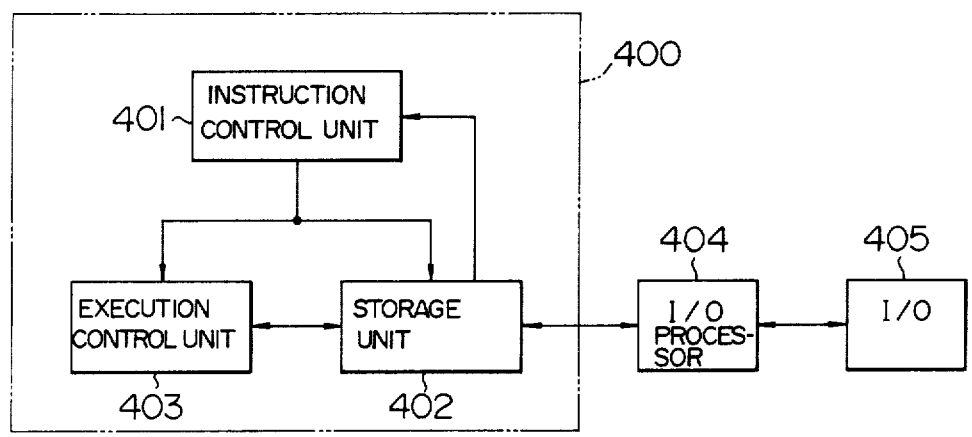
FIG. 3 is a block diagram showing an example of the arrangement of an information processing apparatus embodying the present invention.

FIG. 3 is a block diagram showing an embodiment of the arrangement of the information processing apparatus embodying the present invention.

In the figure, a central processing unit (CPU) 400 is constructed of an instruction control unit 401, a storage unit 402 and an execution control unit 403. The storage unit 402 includes buffers and a main storage and is connected via an I/O processor 404 to an I/O device 405 including disk, MT or the like. The instruction control unit 401 operates in response to an instruction received from the main storage, to access registers or to address the storage unit 402 designated by the decoded instruction, and to read corresponding operands. The execution control unit 403 executes the read operand in accordance with an instruction from the instruction control unit 401. When data is read from or written into the I/O device 405 with respect to CPU 400, the I/O processor 404 initiates the I/O device 405, or counts the data transfer quantity. When CPU 400 requests a read/write to the I/O device 405, the I/O processor 405 instead of CPU 400 controls a read/write operation, during which CPU 400 performs another task. After a read/write operation, the I/O processor 404 informs the CPU 400 of the end of the read/write operation by way of interruption.

Figure 4:
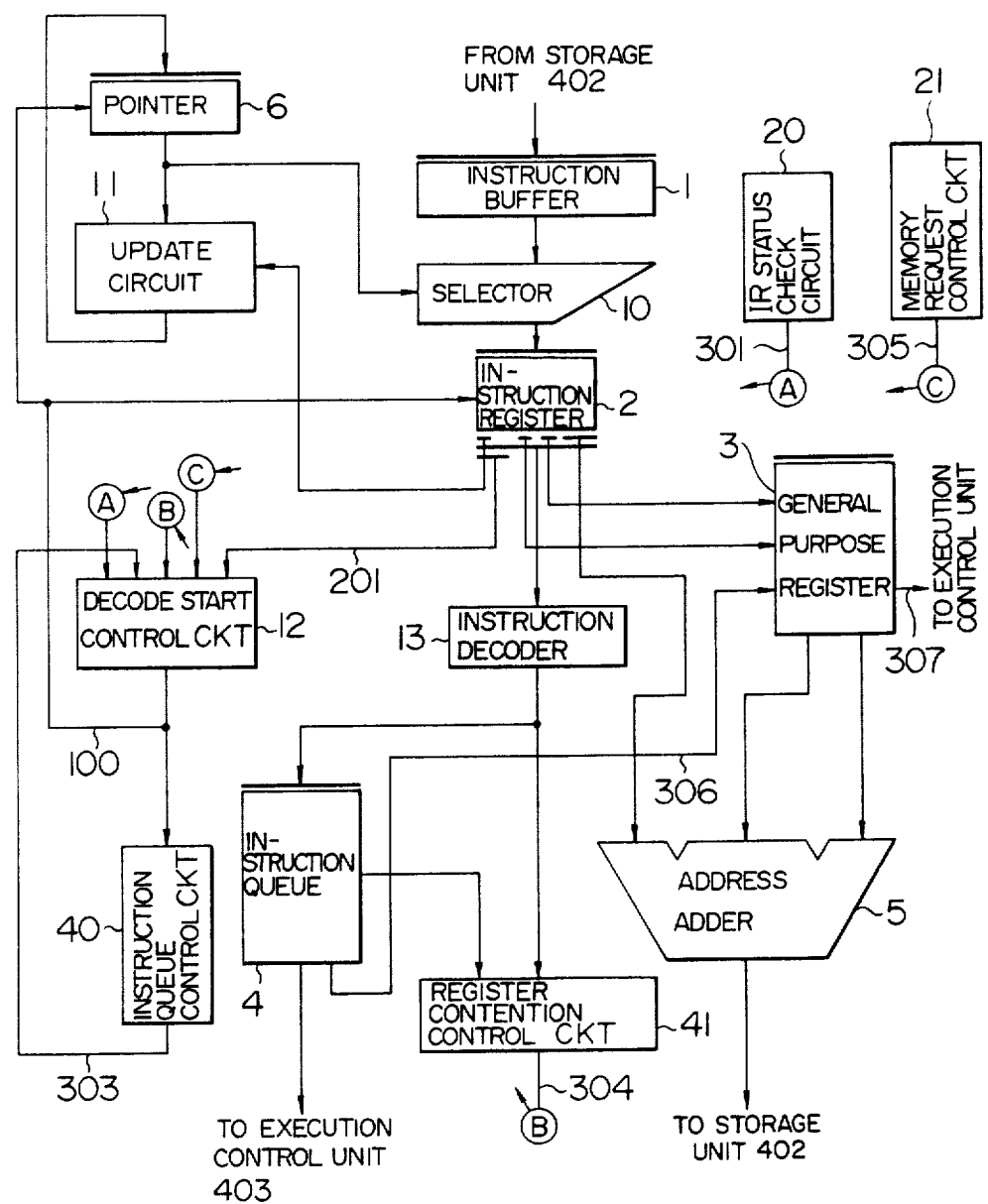
FIG. 4 is a block diagram of an embodiment of the instruction control unit according to the present invention.

FIG. 4 is a block diagram of the instruction unit 401 of this invention which circuit performs the operation shown in FIG. 2B.

Instructions are pre-fetched from the storage unit 402 and loaded in an instruction pre-fetch buffer register 1 (hereinafter abbreviated as instruction buffer). The instructions are fetched one by one from the instruction buffer 1 via a selector circuit 10 to load them in an instruction register 2. The location where an instruction is to be fetched from the instruction buffer 1 is indicated by a pointer 6. At stage D an instruction loaded in the instruction register 2 is decoded by an instruction decoding circuit 13. At the same time, in the case where the instruction loaded in the instruction register 2 is a non-register type instruction, a logical operation of (X2)+(B2)+D2 is executed by an address adder 5, reading the contents of the index register (X2) and the base register (B2) from a general purpose register 3. While the instruction sent from the instruction register 2 is decoded, a decode start control circuit 12 determines whether decoding of the next instruction is ready to be started to send a decode start signal 100 therefrom. The calculated address is sent to the storage unit 402. The instruction decoded by the instruction decoding circuit 13 is loaded in an instruction queue 4, and in turn is sent to the execution control unit 403 at stages A to L. In the case where the instruction loaded in the instruction register 2 is a register type instruction, when the instruction decoded by the instruction decoding circuit 13 is loaded in the instruction queue 4, the instruction queue 4 outputs an address designating signal 306 to the general purpose register 3 to read the first and second operands therein designated by R1 and R2, and sends a signal 307 representing the read operands to the execution control unit 403.

An instruction register status check circuit 20 (hereinafter abbreviated as IR status check circuit) is a known circuit which checks a valid status of instruction register 2 in response to a valid state of the instruction buffer 1 (i.e., if data in the instruction buffer 1 is valid or not). An instruction queue control circuit 40 is a known circuit which checks an empty status of the instruction queue 4 in response to a ready signal (not shown) for execution by the execution control unit 403 and a decode start signal 100. A register contention control circuit 41 is a known circuit which operates to interlock a read register and a write register in the general purpose register 3 for read/write operation therebetween, in response to signals from instruction register 2 and the instruction queue 4. A memory request control circuit 21 is a known circuit which checks a memory request status.

When the decode start signal 100 becomes a logical level "1", the next instruction from the instruction buffer 1 is loaded in the instruction register 2 to thereby enable the start of execution of the D stage of the instruction. The location of an instruction stored in the instruction buffer 1 which instruction is selected therefrom so as to be transferred to the instruction register 2 can be identified by the pointer 6 updated by an update circuit 11.

To start executing the D stage of the next instruction after 0.5 cycle, it is necessary to actuate during 0.5 cycle the signal passage of instruction register 2 → decode start control circuit 12 → instruction register 2 and the signal passage of pointer 6 → update circuit 11 → pointer 6. The logic of the former signal passage has been complicated heretofore so that this passage can operate only at 1 cycle duration.

In this connection, the instruction register 1, selector circuit 10, instruction register 2, decode start control circuit 12, pointer 6 and update circuit 11 constitute as a whole an instruction read unit, and the selector circuit 10 and instruction register 2 constitute an instruction selection and hold unit.

Figure 5:
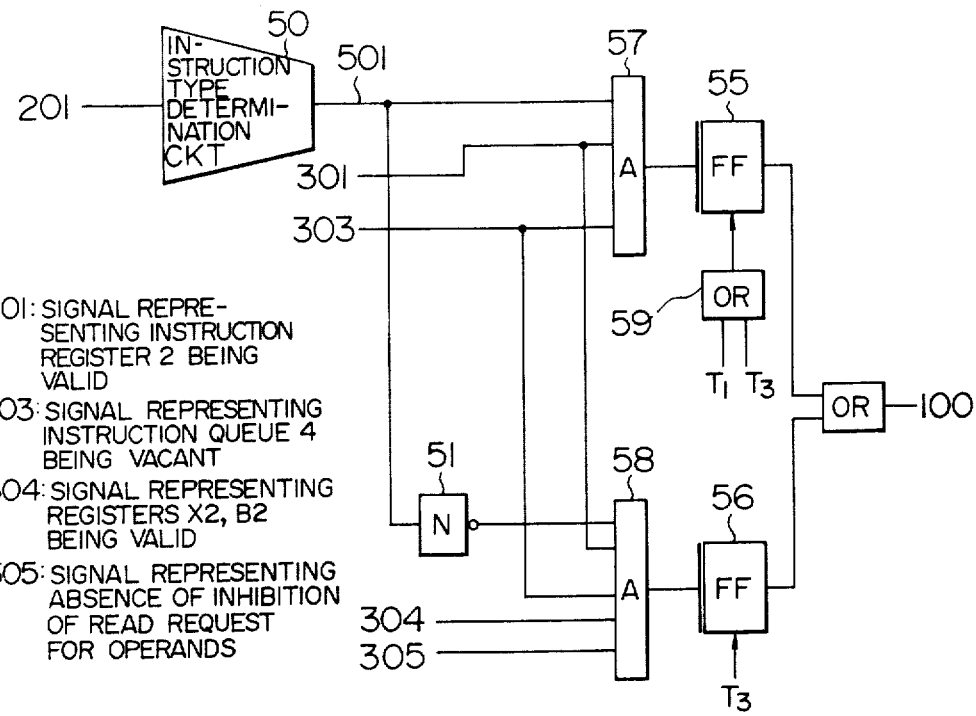
FIG. 5 is a detailed block diagram of the decode start control circuit of FIG. 4.

The gist of the present invention resides in the decode start control circuit 12. FIG. 5 is a detailed block diagram showing the decode start control circuit 12. An instruction from the instruction register 2 via line 201 is judged by an instruction type determination circuit 50 which outputs "1" on line 501 in the case of a register type instruction. A register type instruction can be discriminated by the upper four bits "0000" of the OP code shown in FIG. 1A. In the case of a register type instruction, signals on lines 301, 303 together with "1" on line 501 are applied to an AND gate 57 to perform an AND operation. Thus, an output from the AND gate 57 sets a flip-flop 55 to permit it to output a decode start signal 100 therefrom. The signal on line 301 is a signal outputted from the IR status check circuit 20, which indicates that data in the instruction register 2 is valid. The signal on line 303 is a signal outputted from the instruction queue control circuit 40, which indicates the instruction queue 4 is empty. The flip-flop 55 is set in response to clock pulses $T_1$ and $T_3$ sent thereto through an OR gate 59. The clock pulses $T_1$ and $T_3$ will be described later. Thus, the AND gate 57, flip-flop 55 and OR gate 59 constitute a first determination unit to determine whether, in the case where the instruction which is just started to be decoded is a register type instruction, decoding of the next instruction is ready to be started. In the case of a non-register type instruction, a signal on line 501 becomes "0" so that an output of an inverter 51 becomes "1". Beside the conditions of the signals on lines 301 and 303 as with a register type instruction, signals on line 304 and 305 together with "1" from the inverter 51 are applied to an AND gate 58 to perform an AND operation. Thus, an output from the AND gate 58 sets a flip-flop 56 to permit it to output a decode start signal 100 therefrom. The signal on line 304 is a signal outputted from the register contention control circuit 41, which indicates that the index register (X2) and the base register (B2) are valid. The signal on line 305 is a signal outputted from the memory request control circuit 21, which indicates that an operand read request is not inhibited. The flip-flop 56 is set in response to a clock pulse $T_3$ to be described later.

Thus, the inverter 51, AND gate 58 and flip-flop 56 constitute a second determination unit to determine, in the case where the instruction which is just started to be decoded is a non-register type instruction, decoding of the next instruction is ready to be started.

Those signals on lines 301 and 303 to 305 are known in the art and the logic for producing the same can be easily realized by those skilled in the art.

The signals on lines 301 and 303 are produced by the flip-flops or by the logic with 1 or 2 stages, whereas it is necessary for the signals on lines 304 and 305 to use a number of logical stages. The reason for this is that, for example, in the case of the signal on line 304, it is necessary to compare the X2 and B2 fields of an instruction with the R1 field of the instruction queue 4 which is waiting for executing an instruction, using the register contention control circuit 41. In other words, it is necessary to check if there is any instruction among those instructions waiting for execution, which instruction requires to change the contents of the index registers (X2) and base registers (B2). Further, there is an instruction among those in the instruction queue 4, which instruction requires a change in the contents of a plurality of registers so that it is necessary to discriminate such an instruction on the basis of the OP field thereof.

Figure 6:
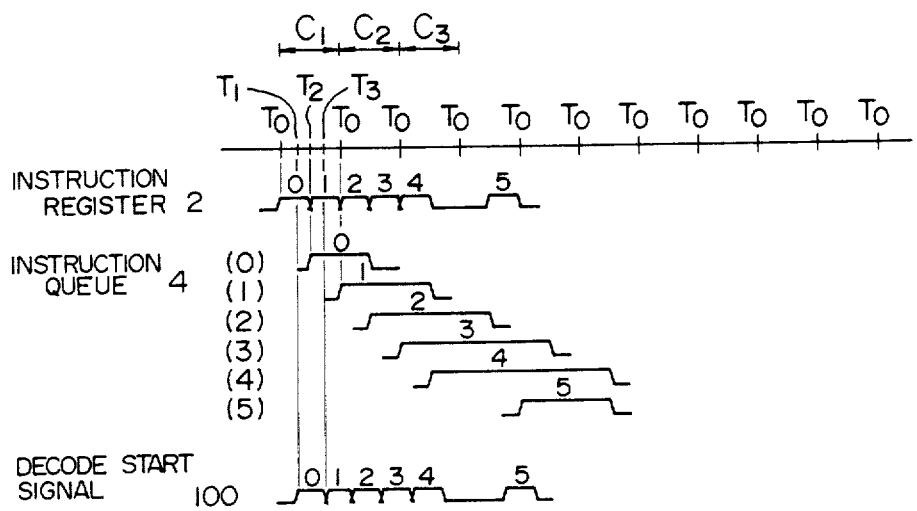
FIG. 6 is a timing chart illustrating an operation of the apparatus of FIG. 4.

Next, the operation illustrated in FIG. 2B will be described with reference to the timing chart of FIG. 6.

One cycle is defined by a duration from a clock T0 to the next clock T0. One cycle is divided by 4 sections which are controlled by 4 clocks T0, T1, T2 and T3. Instruction 0 is set to the instruction register 2 at T0 of $C_1$ cycle. Since instruction 0 is of register type, the flip-flop 55 of FIG. 5 outputs "1" at T1 of cycle $C_1$ to set a decode start signal 100 to "1", then the instruction register 2 is switched so that the next instruction 1 is placed in the instruction register 2 at T2 of cycle $C_1$. In the mean time, the decoded instruction 0 is set to the instruction queue 4 (as depicted as the 0th order in the figure) at T2 of cycle T2. Similarly, since instruction 1 is of register type, the flip-flop 55 outputs "1" at T3 of cycle $C_1$ to set a decode start signal 100 to "1", then the instruction register 2 is switched so that the next instruction 2 is placed in the instruction register 2 at T0 of cycle $C_2$. The decoded instruction 1 is set to the instruction queue 4 (as depicted as the 1st order in the figure) at T0 of cycle $C_2$. As above, the instruction register 2 is switched by both clocks T0 and T2. Similarly, the flip-flop 55 for outputting a decode start signal in connection with a register type instruction is set by both clocks T1 and T3. Also the instruction queue 4 is set at both clocks T0 and T2. In this case it is to be noted that the flip-flop 56 for outputting a decode start signal in connection with a non-register type instruction is set only by clock T3, and that the instruction queue 4 is always reset by clock T2 because stage E is executed at intervals of 1 cycle pitch.

In the present invention, on the basis of recognition that the determination circuit for determining whether the decoding of the next instruction is ready to be started in the case of a register type instruction just being started to be decoded is simple, a conventional decode start control circuit was divided into two circuits, one for register type instructions and the other for non-register type instructions. Thus, according to the present invention, determining whether the decoding of the next instruction is ready when a register type instruction has been just started to be decoded can be achieved at high speed.

As seen from the foregoing description, in the present invention, stage D of a register type instruction can start executing 0.5 cycle after the start of executing stage D of the preceding instruction. Therefore, as compared with a conventional one, a branch instruction can be executed at high speed, thereby improving the operating property of the information processing apparatus.

The present invention is very advantageous because a register type instruction is a fundamental instruction which is used in practice at occurrence frequency of about 25 to 30%.

What is claimed is:

1. An information processing apparatus comprising:
   storage means for storing at least instructions and data;
   instruction control means, coupled to said storage means, for controlling the execution of instructions read out of said storage means, said instruction control means including a general purpose register, instruction read means for reading said instructions out of said storage means, decoding means for decoding said instructions read out of said storage means, data read means for reading out of said storage means and said general purpose register data necessary for executing said decoded instructions, and an instruction queue for storing said decoded instructions; and
   execution control means, coupled to said storage means and said instruction control means, for arithmetically processing said data read out by said data read means on the basis of said decoded instructions sent from said instruction queue;
   said instruction read means further including:
   a buffer register, coupled to said storage means, for pre-fetching a plurality of instructions out of said storage means;
   instruction selection and hold means for selecting instructions one by one from said plurality of instructions in said buffer register and for sending each selected instruction to said decoding means; and
   decode start control means for controlling the start of decoding of and instruction, including instruction type determination means for determining whether an instruction being decoded by said decoding means is a first type instruction or a second type instruction, said first type instruction being of the type wherein all of the data necessary for executing said first type instruction are stored in said general purpose register and said second type instruction being of the type wherein at least some of the data necessary for executing said second type instruction is stored in said storage means, first determination means for determining, when an instruction selected by said instruction selection and hold means is said first type instruction, whether decoding of an instruction to be decoded following said first type instruction is ready to be decoded and a second determination means for determining, when an instruction selected by said instruction selection and hold means is said second type instruction, whether decoding of an instruction to be decoded following said second type instruction is ready to be decoded, said first determination means operating at a higher speed than said second determination means in completing said determination, said decode start control means including means for controlling said instruction selection and hold means so that an instruction to be decoded following an instruction which is being decoded is set to said decoding means in response to said first or said second determination means.

2. An information processing apparatus according to claim 1, wherein said instruction selection and hold means includes instruction selection means for selecting one instruction at a time from said buffer register and instruction register for storing said one instruction,
   wherein said instruction control means further includes first means for monitoring the validity of an instruction in said instruction register and for generating a first signal when said instruction is valid, second means for monitoring said instruction queue to determine whether there is a vacancy therein and for generating a second signal when a vacancy is detected, third means for monitoring the validity of data in a register which is included in said general purpose register and is designated by said first type register and for generating a third signal when valid data is detected, and fourth means for monitoring whether a data read request to said storage means is not inhibited and for generating a fourth signal when a data read request is not inhibited;
   wherein said first determination means includes first AND gate means for logically ANDing an output signal of said instruction type determination means, representing said instruction which is being decoded and is said first type instruction, said first signal and said second signal and a first flip-flop connected to the output of said AND gate means for generating a first decode start signal in response to a first clock signal, and
   wherein said second determination means includes second AND gate means for logically ANDing an output signal of said instruction type determination means, representing said instruction which is being decoded and is said second type instruction, and said first to fourth signals, a second flip-flop connected to the output of said second AND gate means for generating a second decode start signal in response to a second clock signal, said instruction selection means selecting an instruction to be decoded in response to said first or second decode start signals, and the time interval between clock pulses contained in said first clock signal being half that between clock pulses contained in said second clock signal.

3. An information processing apparatus according to claim 2, wherein said instruction selection and hold means further includes pointer means connected to said instruction selection means for indicating a location in said buffer register of an instruction to be sent to said instruction register and update means connected to said pointer means for updating said pointer means.

4. An information processing apparatus according to claim 1, wherein the output of said first determination means operates in response to a first clock signal and said second determination means operates in response to the second clock signal, a time interval of clock pulses contained in said first clock signal being half that between clock pulses contained in said second clock signal.

5. In an information processing apparatus having storage means for storing instructions, including register type instructions and non-register type instructions, decoding means for decoding instructions read out of said storage means, and instruction read means for reading out instructions from said storage means and applying said read-out instructions to said decoding means, the improvement comprising:

instruction type determination means for determining whether an instruction read out of said storage means by said instruction read means is a register type instruction or a non-register type instruction;

first determination means, responsive to an indication from said instruction type determination means that an instruction is a register type instruction, for producing an output when an instruction from said instruction read means following said register type instruction is ready to be decoded;

second determination means, responsive to an indication from said instruction type determination means that an instruction is a non-register type instruction, for producing an output when an instruction from said instruction read means following said non-register type instruction is ready to be decoded; and control means for controlling said instruction read means to apply an instruction to said decoding means in response to an output from said first or said second determination means, wherein said first determination means operates in response to a first clock signal and said second determination means operates in response to a second clock signal, the time interval of clock pulses contained in said first clock signal being half that between clock pulses contained in said second clock signal.

* * * * *